July 28, 1953 W. E. COYKENDALL, JR 2,646,958
SHOCKPROOF MOUNTING
Filed May 6, 1949

INVENTOR
William E. Coykendall, Jr.
BY
Pennie Edmonds Morton Barrows
ATTORNEYS

Patented July 28, 1953

2,646,958

UNITED STATES PATENT OFFICE 2,646,958

SHOCKPROOF MOUNTING

William E. Coykendall, Jr., Riverside, Conn., assignor to Machlett Laboratories Incorporated, Springdale, Conn., a corporation of Connecticut Application May 6, 1949, Serial No. 91,671

3 Claims. (Cl. 248—358)

This invention relates to shockproof mountings, in which articles of various kinds may be supported without danger of being damaged by shocks, to which the supporting structure is subjected. More particularly, the invention relates to that type of shockproof mounting which prevents shocks, applied to the mounting from any direction, from being transmitted to the supported article. The new mounting is especially adapted for supporting electron tubes and, as all of its advantages are utilized when it is used for such purposes, an embodiment of the invention for that particular application will be described in detail for purposes of explanation.

The mounting of the invention in a form suitable for securing an electron tube in place on a support having an opening, into which part of the tube may extend, comprises a pair of annular members of a size to encircle the part of the tube, to which the mounting is to be applied. One of the members is adapted to be attached to the tube and may be a collar forming a permanent part of the tube or made of two or more parts adapted to be secured to a part of the tube. The other member is adapted to be attached to the support around the opening. One of the annular members has a channel in one of its axial faces and the other has a radial flange extending into the channel and a pair of axial shoulders on either side of the flange and facing the channel, although lying outside it. A pair of toroidal rings of resilient material and of the type commonly termed "O-rings" lie within the channel on opposite sides of the flange and in engagement with its radial faces and the rings also engage the bottom of the channel and the peripheral surfaces of the shoulders. With this arrangement of the parts, shocks applied to the support in any direction are absorbed by the rings and the dimensions and spacings of the parts are such as to permit distortion of the rings while preventing contact between the members.

Figure 1:
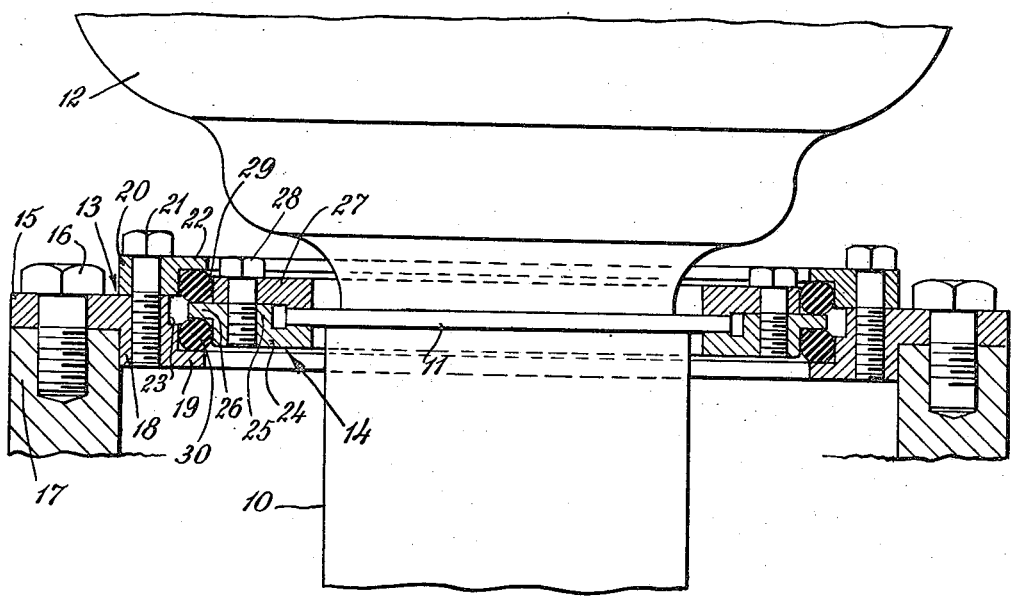
Figure 2:
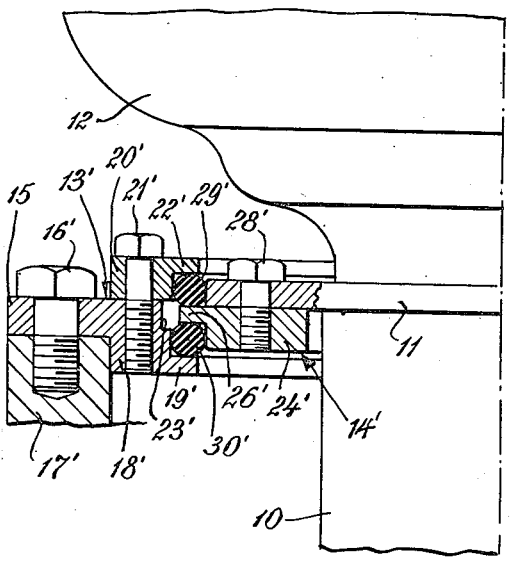

For a better understanding of the invention reference may be made to the accompanying drawing in which:

Fig. 1 is a longitudinal sectional view showing one form of the new mounting; and Fig. 2 is a fragmentary longitudinal sectional view showing another form of the mounting.

The shockproof mountings shown are intended to be used with an electron tube which comprises an anode section 10 of generally cylindrical form. The tube has a peripheral flange or collar 11 adjacent the inner end of the anode section and, beyond the collar, the tube includes a glass envelope 12 sealed to the enlarged inner end of the anode section.

The shockproof mounting shown in Fig. 1 comprises a pair of annular members indicated generally at 13 and 14. The member 13 includes a flat ring 15, which may be secured by bolts 16 to a support 17 around an opening therein. The ring has an offset inner section 18, which lies along the inner wall of the opening and has a flange 19 offset from the plane of the main part of the ring. The member 13 also includes a second ring 20 secured to ring 15 by bolts 21. Ring 20 is provided with an inwardly extending flange 22, which is spaced from and of the same inner diameter as flange 19. Flanges 19 and 22 define a channel in the inner axial face of member 13 and ring 15 is formed with a sub-channel 23 extending outwardly midway between the flanges.

The annular member 14 includes a ring 24 adapted to be secured to one radial surface of the collar 11 of the tube. Ring 24 has an offset outer section 25 overlying the peripheral surface of collar 11 and terminating in a flange 26, which projects into the channel between flanges 19 and 22 of member 13 and lies opposite the sub-channel 23. The member 14 also includes a flat ring 27 engaging the other radial surface of collar 11 and secured to ring 24 by bolts 28, rings 24 and 27 clamping collar 11 between them. The outer faces of rings 24 and 27 form a pair of axially extending shoulders lying on opposite sides of flange 26 and facing the channel between flanges 19 and 22, although lying outside the channel.

A pair of rings 29, 30 of resilient material and of toroidal form lie in the channel between flanges 19, 22 and in engagement with the opposite radial faces of flange 26 of member 14. The rings 29, 30 are of the type commonly referred to as "O-rings" and ring 29 bears against the axial shoulder formed by the outer face of ring 27, the lower radial surface of flange 22, and the axial face of ring 20. Ring 30 bears against the axial shoulder formed by the outer face of ring 24, the upper radial surface of flange 19, and the axial face of the inner section 18 of ring 15. The resilient rings may be made of natural rubber or of a suitable synthetic rubber-like material, and are preferably circular in cross-section, although rings of other cross-sectional shapes may also be employed in some applications. To provide varying amounts of shock damping, the rings 29, 30 may be made of material of different hardnesses or durometer ratings, depending upon the intensity and duration of the shocks anticipated. For example, accelerometer tests have shown that for a shock of an intensity of 1000 G applied in ¾ of a millisecond, O-rings of 30 durometer rating provide approximately twice the shock damping characteristics of the O-rings of 70 durometer rating but over a larger number of damping cycles.

The rings 29, 30 are of the same cross-sectional diameter and all of the axial and radial surfaces, with which a ring is engaged, are equal in width and of approximately ¾ to ⅘ the cross-sectional diameter of the ring. The radial depth of the sub-channel 23 is approximately ¼ to ⅕ the cross-sectional diameter of the rings. The axial thickness of the annular member 14 is substantially less than the distance between the opposed faces of flanges 19 and 22, so that the outer radial faces of rings 24 and 27 lie offset inward from inner ends of the flanges. With the construction described, the application to the mounting of a shock in the radial direction tends to compress the rings radially between axial surfaces on members 13, 14 and to cause elongation of the rings in an axial direction. Such elongation is prevented, however, by flanges 19, 22, and 26, so that a damping effect in both radial and axial directions results. Under such a shock, the rings become distorted toward the corners of the spaces defined by the radial and axial surfaces, between which the rings are confined. In the event of an axial shock, the same action takes place, except that the rings are compressed axially and tend to elongate radially. Again, there is a double damping effect. The purpose of sub-channel 23 is to permit additional movement of the parts of the mounting radially while preventing flange 26 from striking ring 15 and the offsetting of the outer radial faces of rings 24 and 27 inwardly from the opposed faces of flanges 19 and 22 insures that the parts of the mounting may move relatively to one another through substantial distances without contact of metal parts.

In the modified form of the new mounting shown in Fig. 2, the outer annular member 13' is of the same construction as member 13 and made up of similar parts indicated by the same reference characters primed. Member 13' is held in place on support 17' around an opening therein by bolts 16'. The inner annular member 14' includes a ring 24' and held against one radial face of collar 11 of the anode section 10 of the tube by bolts 28' passing through the collar and into the ring. The outer axial face of ring 24' forms a shoulder at one side of flange 26' on the ring and the peripheral surface of collar 11 forms a shoulder at the other side of the flange. O-rings 29', 30' bear against the shoulders and the radial faces on flange 26' and also against the opposed radial faces of flanges 19', 22' and the bottom of the channel in annular member 13' between flanges 19', 22'. The action of the mounting of Fig. 2 is the same as that of the first form of the mounting, in that relative movement of one of the members 13, 14 relative to the other causes distortion of one or both O-rings, with the resilient material preventing contact between the members.

In the constructions illustrated, the outer annular member 13 is formed with a channel in its inner axial surface and a radial flange on the inner annular member 14 extends into the channel. It will be apparent that the positions of the channel and the flange may be reversed without changing the operation of the mounting. Also, instead of forming the inner member 14 of one or two parts secured to the tube collar or clamping the collar between them, the collar itself may be formed to provide flange 26 with shoulders on opposite sides thereof or with a channel similar to that defined by flanges 19, 22. The outer member 13 may be of a single part of proper shape, instead of two parts. When either of members 13, 14 is made of a single part, the other member is made of two or more parts. In any of the constructions described, the annular member 13 and the parts of member 14 exclusive of the tube collar 11 may be formed of arcuate sections to facilitate assembling.

In the foregoing, the mounting has been described in a form suitable for use with electron tubes, but it will be apparent that the mounting may be employed for numerous other purposes as, for example, for supporting meters, gauges, and similar delicate instruments. The mounting shown is of circular form but it will function equally well if of square or rectangular shape.

I claim:

1. A shockproof mounting for securing an article to a support having an opening into which the article is to extend, which mounting comprises a pair of annular members of a size to encircle the article, one member being adapted to be secured to the article and the other being adapted to be secured to the support around the opening therein, one of the members having a circumferential channel in one of its axial faces, the side walls of which channel are arranged at right angles to the channel bottom, and the other member having a radial flange received in said channel, the parallel surfaces of which flange oppose the respective channel side walls, and axial cylindrical shoulders on both sides of the flange at right angles to the parallel surfaces of the flange, which shoulders are concentric with the channel bottom, thereby effectively providing four pairs of opposed surfaces which bound two annular spaces of approximately square radial cross-section, a pair of toroidal rings of resilient material and of solid substantially undeformed circular cross-section within the respective annular spaces and in peripheral contact with the four surfaces bounding their respective spaces so that the toroidal rings are deformable between opposed pairs of surfaces.

2. A structure essentially as claimed in claim 1, in which the channel is placed in the outer member and the flange is placed on the inner member.

3. A structure essentially as claimed in claim 1, in which a sub-channel is formed in the member bearing the channel in the axial face formed by the bottom of said channel such that said sub-channel is opposite the flange on the other member and wider than said flange.

WILLIAM E. COYKENDALL, JR.

References Cited in the file of this patent

UNITED STATES PATENTS

| Number | Name | Date |
|---|---|---|
| 1,307,661 | Forger | June 24, 1919 |
| 1,783,410 | Cowell | Dec. 2, 1930 |
| 2,195,180 | Marzetti | Mar. 26, 1940 |
| 2,386,248 | Marzetti | Oct. 9, 1945 |
| 2,502,322 | Iredell | Mar. 28, 1950 |
| 2,505,163 | Wanner | Apr. 25, 1950 |